May 1, 1951 A. FORD 2,551,322
LOADER
Filed March 9, 1950 2 Sheets-Sheet 1

Inventor
Alfred Ford
by Robert L Kahn
Attorney.

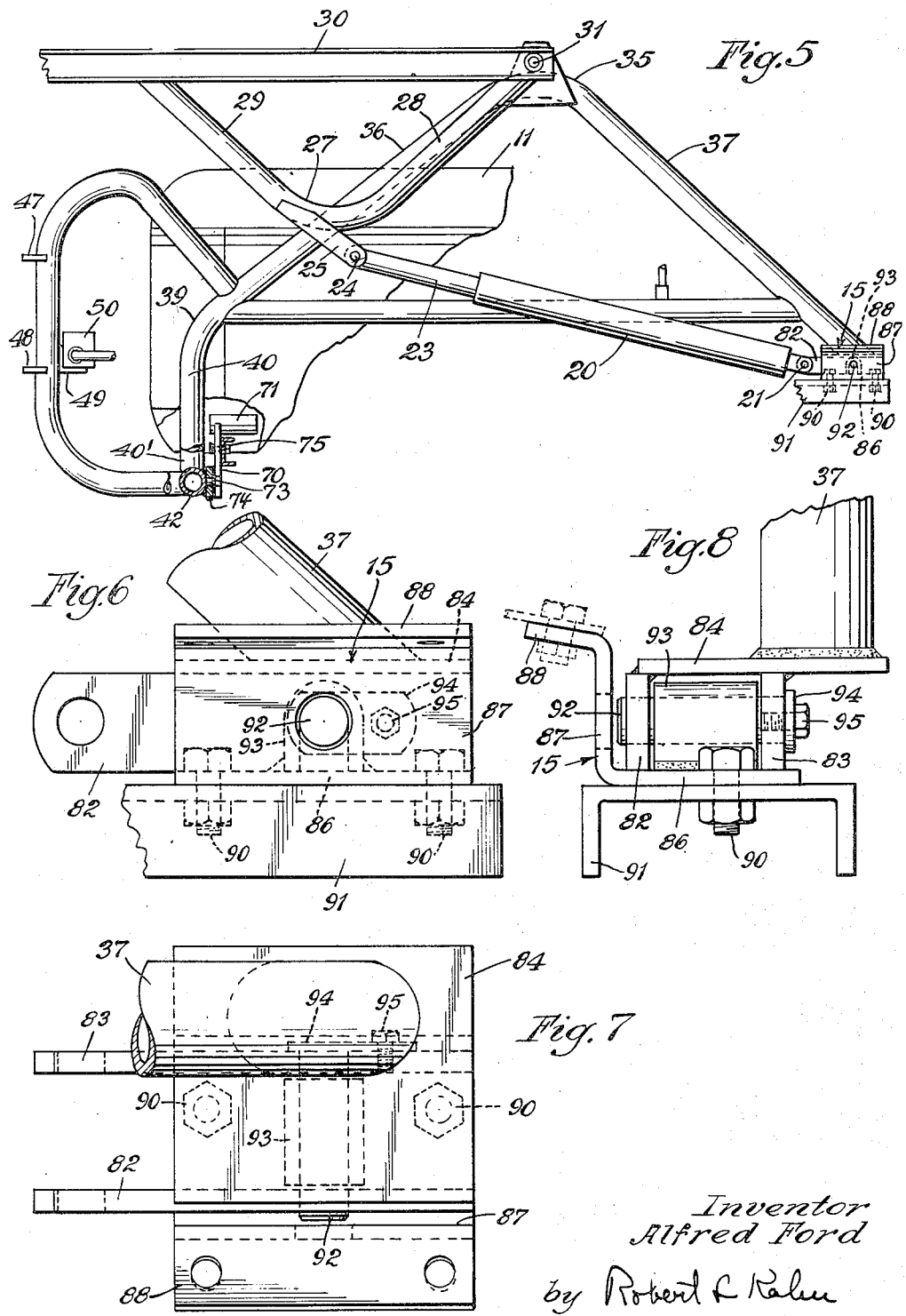

Patented May 1, 1951

2,551,322

UNITED STATES PATENT OFFICE 2,551,322

LOADER

Alfred Ford, Chicago, Ill., assignor, by mesne assignments, to Dearborn Motors Corporation, Highland Park, Mich., a corporation of Delaware Application March 9, 1950, Serial No. 148,633

3 Claims. (Cl. 214—131)

This invention relates to a loader for use with tractors and particularly relates to a power-operated loader for use with tractors having fenders.

Conventional tractors are frequently required to have fenders over the rear tires as a safety measure. Inasmuch as loaders and similar devices are generally mounted at least in part, over the rear axle of a tractor, it is necessary to accommodate the fenders either when the loader is attached to the tractor or when the loader is removed therefrom. The removal and replacement of fenders under the above circumstances is undesirable and generally represents useless and unnecessary labor. This invention provides a means for mounting or dismounting a loader from a tractor without interfering with the fenders. By virtue of the present invention a tractor may carry a loader and remain in a safe condition with the loader being relatively detachable from the tractor without in any way impairing the safety standards of the tractor. In present day structures, the removal or mounting of a loader from or on a tractor involves considerable labor and where fenders ought to be removed or replaced, the additional labor thus required frequently tempts an operator to omit the fenders. In such cases, the absence of a fender makes the tractor dangerous to an operator and generally violates local regulations relating thereto.

Figure 1:
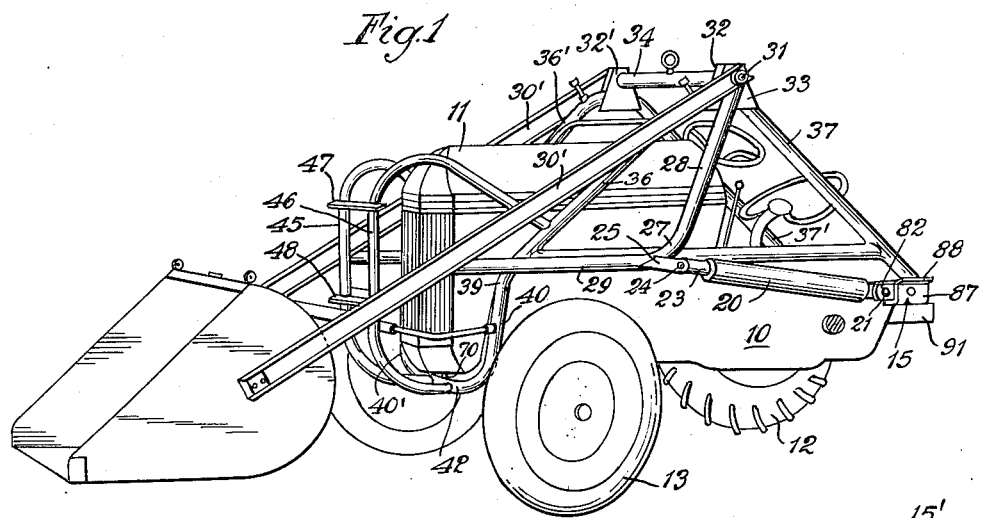
Figure 2:
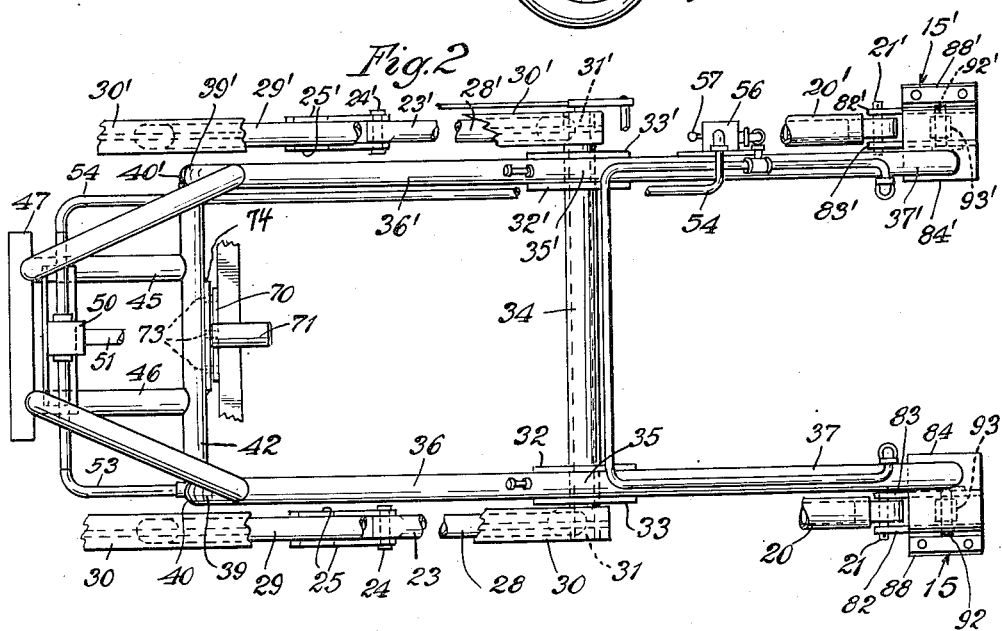
Figure 3:
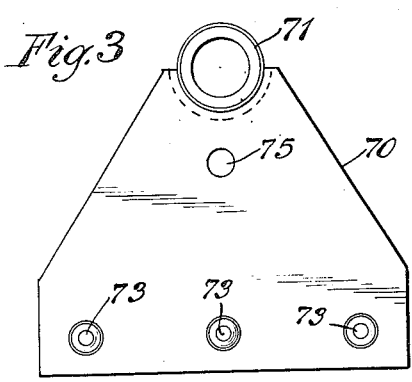
Figure 4:
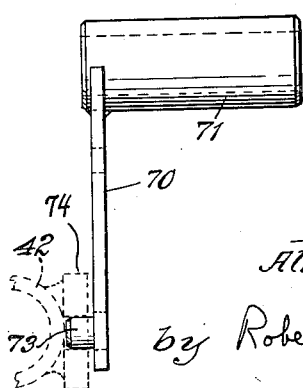

The loader to which this invention pertains may be any type but is preferably of the construction disclosed in my prior Patent 2,489,629 issued on November 29, 1949. In order that the invention will be understood, it will now be explained in connection with the drawings wherein Figure 1 is a perspective view of a tractor with a loader mounted thereon with the mounting means involving the present invention, one of the rear wheels being omitted to show more clearly the mounting. Figure 2 is a top plan view of the loader shown in Figure 1. Figure 3 is a front view of a mounting plate carried by the tractor for supporting the loader at the front of the tractor. Figure 4 is a side view of the plate shown in Figure 3. Figure 5 is a side view of a loader illustrating the mounting on a tractor at both the front and rear thereof. Figure 6 is a side detail of the mounting means at one of the rear wheels of the tractor. Figure 7 is a top view of the structure shown in Figure 6, while Figure 8 is an end view of the structure shown in Figure 6.

Tractor 10 may be of any desired construction having an engine suitably disposed under hood 11 and having rear wheels 12 (only one is illustrated) and front wheels 13. Carried by the tractor by means that will be described later, is a loader more fully described in my prior Patent 2,489,629. This loader comprises cylinders 20 and 20' pivotally mounted to brackets 15 and 15' by means of pivots 21 and 21'. Where duplicate parts on opposite sides are provided, such parts will bear similar numbers with one set of numbers being primed. For ease in description, only one set of numbers will be specifically referred to. Cylinder 20 has slideably disposed therein piston 23 whose free end is pivotally secured at 24, bracket 25 of the loader frame. Bracket 25 is rigidly attached to bent tubular member 27 having arms 28 and 29 respectively. Arms 28 and 29 are rigidly attached to beam 30. Beam 30 is pivotally secured at 31. Pivot 31 is part of cross-member 34 and extends transversely of the loader so that the two ends function as pivots on opposite side of the loader.

Welded between plates 32 and 33 carried by cross-member 34 is elbow 35 having arms 36 and 37 respectively. Arm 36 terminates in second elbow 39 from which pipe portion 40 extends downwardly. Transversely spaced pipe portions 40 and 40' are connected together at their lower ends by cross-pipe 42.

A protective frame-work comprising members 45 and 46 extends between two points of cross-pipe 42 and suitable points on elbows 39 and 39'. If desired, braces 47 and 48 may be provided to extend between members 45 and 46. As is evident in Figure 1, this protective frame-work is designed to be in front of the radiator of the tractor. It is understood that members 45 and 46 may be tubular but are preferably sealed from the remainder of the system so that no fluid flow occurs therein.

Carried by protective frame-work, in this particular instance by cross-member 49, is pump 50 of any suitable design. In practice, pump 50 may be of the gear type and be provided with shaft 51 for connection to the front end of the crank shaft of the tractor engine or to a separate engine, as desired. Pump 50 has inlet pipe 53 and outlet pipe 54 and is adapted to operate on any suitable medium such as oil, water or the like. Inlet pipe 53 is tapped into any part of the frame for liquid storage, as elbow 39. The inlet is tapped in at any point of the system, preferably at the same level as pump 50 or above pump 50.

Outlet pipe 54 of the pump extends along the loader and goes to valve 56 having control handle 57. Valve 56 is a three-way valve having suitable connections. It is understood that valve 56, as more thoroughly explained in the aforementioned patent, will provide for movement of the loader up and movement of the loader down or for maintaining the loader in any desired position. The various fluid line connections are more fully described in the aforementioned patent and reference is therefore made to this patent for a more complete description thereof.

In order to carry the loader on the tractor, there is mounted at the front of the tractor, plate 70 having sleeve 71 through which may pass the driving shaft for the gear type, or other type, of pump. Plate 70 also carries at the bottom thereof, a number of pins 73. The plate may be bolted to the tractor by one or more bolts 75, the plate being mounted with the plane transverse to the tractor and sleeve 71 extending rearwardly of the tractor and pins 73 extending forwardly thereof. Cooperating with pins 73 is apertured plate 74 carried on cross-pipe 42. The apertures in plate 74 register with pins 73 in the normal mounted position of the attachment.

The rear of the loader has two similar mounting means disposed on opposite sides thereof. Inasmuch as these mounting means are the same, only one will be described in detail. Thus pivot 21 is mounted in vertical plate 82. Plates 82 and 83 are spaced parallel plates and are secured as by welding to top plate 84 extending transversely of plates 82 and 83. Plate 84 carries part 37 of the attachment frame. Plates 82 and 83 rest upon part 86 of generally Z-shaped bracket 87. Bracket 87 has end portion 88 upon which may be bolted a fender as shown in dotted lines. Portion 86 of the bracket is suitably drilled to receive bolts 90 passing through part 86 of the bracket and also body portion 91 of the tractor.

Pin 92 passes through suitable apertures in plates 82 and 83 and is supported in U-shaped bracket 93 welded to part 86. Pin 92 carries plate 94 at one end and this plate is apertured to receive bolt 95. Bolt 95 engages a suitably tapped hole in plate 83. By removing bolt 95 (and companion bolt 95') pin 92 (and 92') may be removed. Upon raising of the rear end of the loader, it is possible to move the loader a short distance to the front end of the tractor and disengage the front mounting means. By virtue of this, it will be noted that the fender carried by part 88 of the Z-shaped bracket will not be distributed. It is understood that the fenders would be the ones generally used on tractors, being free laterally on both sides of the wheels.

What is claimed is:

1. A loading attachment for tractors and the like comprising a frame, a pair of arms pivotally attached to said frame and being movable up and down and being adapted to be loaded at the ends of said arms, means including a pair of cylinders and pistons for controlling the position of said arms, said attachment frame having rear legs for attachment to a tractor and having two brackets, each bracket including a pair of spaced horizontal plates, a pair of spaced vertical plates extending between said horizontal plates and rigidly attached thereto, said bottom plates having a portion extending outwardly and upwardly and being adapted to be attached to a tractor and to support a fender, means for mounting a rear leg of the frame on said two vertical plates, said means including a pin removable from said plates to free said legs, and pin and socket means at the front of the tractor cooperating with the front of the frame for supporting said frame in position.

2. A loading attachment for tractors and the like comprising a frame having a pair of arms pivotally attached thereto, said arms being adapted to be loaded at the ends thereof, said frame having rear legs for attachment to a pair of brackets mounted on said tractor, each bracket including a pair of spaced horizontal plates, a pair of spaced vertical plates extending between said horizontal plates and rigidly attached thereto, the bottom plate extending upwardly and outwardly and being adapted to support a fender permanently and being mounted on the tractor, said vertical plates being apertured, a pin, each rear leg of the attachment having an apertured portion through which the pin passes, a bracket attached to tractor at the front thereof, and pin and socket means carried by the last named bracket and attachment for maintaining the front of the attachment in position upon said tractor, said attachment being adapted to be elevated at the rear thereof upon removal of the first named pins and being adapted to be moved forwardly with respect to the tractor in order to free the front pin mounting means.

3. The structure according to claim 2 wherein the bracket at the front of the tractor is disposed substantially at the center thereof and carries pins extending forwardly therefrom and wherein the attachment has a part having apertures for receiving said pins when said attachment is properly positioned.

ALFRED FORD.

No references cited.